US007030529B2

(12) United States Patent
Dommsch et al.

(10) Patent No.: US 7,030,529 B2
(45) Date of Patent: Apr. 18, 2006

(54) ELECTRICAL MACHINES, ESPECIALLY ENGINES EXCITED BY PERMANENT MAGNETS

(75) Inventors: Hans-Peter Dommsch, Buehlertal (DE); Guenter Kastinger, Gaggenau-Sulzbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/492,413

(22) PCT Filed: Jan. 29, 2003

(86) PCT No.: PCT/DE03/00236

§ 371 (c)(1),
(2), (4) Date: Apr. 12, 2004

(87) PCT Pub. No.: WO03/085802

PCT Pub. Date: Oct. 16, 2003

(65) Prior Publication Data

US 2004/0263012 A1   Dec. 30, 2004

(30) Foreign Application Priority Data

Apr. 6, 2002   (DE) .............................. 102 15 251

(51) Int. Cl.
 *H02K 21/12*   (2006.01)
(52) U.S. Cl. .......................... 310/156.22; 310/156.08; 310/156.36; 310/156.38; 310/156.19

(58) Field of Classification Search ........... 310/156.08, 310/156.12, 156.36, 156.38, 156.22
See application file for complete search history.

(56) References Cited

U.S. PATENT DOCUMENTS

| 4,837,472 A | * | 6/1989 | Kotera ................... 310/156.22 |
| 4,962,329 A | * | 10/1990 | Fujita et al. ................ 310/208 |
| 6,229,238 B1 | | 5/2001 | Graef |

FOREIGN PATENT DOCUMENTS

| DE | 41 07 602 A1 | | 9/1992 |
| DE | 4107602 A1 | * | 9/1992 |
| DE | 44 00 614 A1 | | 6/1994 |
| EP | 0 549 430 A1 | | 6/1993 |
| EP | 0 952 657 A2 | | 10/1999 |

* cited by examiner

*Primary Examiner*—Darren Schuberg
*Assistant Examiner*—Erik Preston
(74) *Attorney, Agent, or Firm*—Ronald E. Greigg

(57) ABSTRACT

A permanent magnet-excited electric motor with a rotating rotor having permanent magnets disposed with alternating polarities in a ring around its circumference, which magnets cooperate with coils of a stator encompassing the rotor. The permanent magnets, as individual magnets next to one another that are distributed uniformly over the circumference of the rotor, rest on an annular support and are clamped in place at their axial ends by a respective annular frame made of magnetically inactive material.

13 Claims, 2 Drawing Sheets

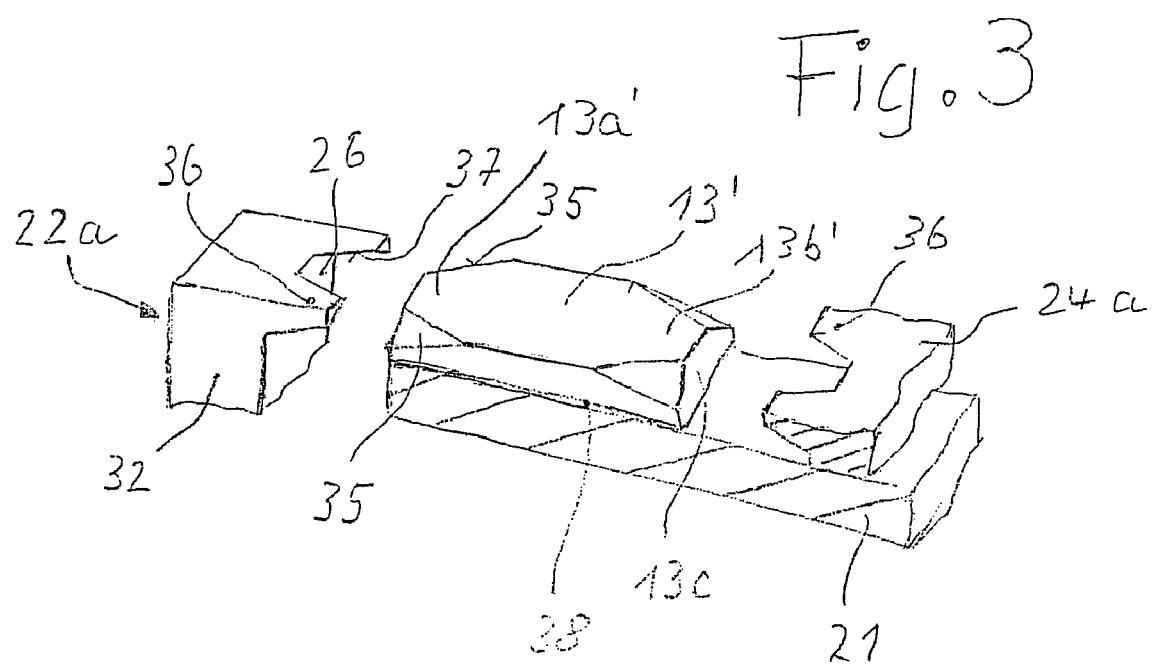

ELECTRICAL MACHINES, ESPECIALLY ENGINES EXCITED BY PERMANENT MAGNETS

CROSS-REFERENCE TO RELATED APPLICATIONS

This application is a 35 USC 371 application of PCT/DE 03/00236 filed on Jan. 29, 2003.

BACKGROUND OF THE INVENTION

1. Field of the invention

The invention relates to an improved electrical machine, in particular a permanent magnet-excited motor with a rotating rotor.

2. Description of the Prior Art

Electrical machines that function as motors or generators include subgroups whose rotors have permanent magnets that constitute poles with alternating polarities along the circumference of the rotor and as a rule cooperate with electrical coils of a stator concentrically encompassing the rotor. The electrical coils of the stator generate a rotating field that carries the rotor along with it at a synchronous speed. Depending on the activation of the stator coils, these machines can also be used as so-called stepping motors, which can be exactly set to predetermined positions, for example in order to drive actuators. A subgroup of these electrical machines with permanent magnet excitation is known in the literature as a transverse flux machine, for example see Michael Bork "Designs of Transverse Flux Machines" [Bauformen von Transversalflussmaschinen], Diss. 82, RWTH Aachen; Shaker-Verlag Aachen, 1997; pp. 6 ff. In the dissertation cited, the permanent magnets of the rotor form two annular arrangements spaced apart from each other on the circumference of the rotor, which cooperate with U-shaped magnetic yokes in the stator of the machines.

In the various designs of rotors with permanent magnet excitation, the permanent magnets are, for example, glued or cast in a ring around the circumference of the rotor and are then magnetized.

This has the disadvantage of requiring a special magnetizing device for the magnetization. In addition, the transitions of the alternating polarities along the rotor surface are imprecise due to this kind of magnetization, which has a negative effect on the machine output. In addition, with magnetizing devices of this kind, the individual permanent magnets cannot be embodied with an arbitrarily narrow width so that with a predetermined number of poles, it is possible that larger rotor diameters will be required than would be necessary for the machine output. In other designs of the rotor in which prefabricated tube sections made of magnetic material with premagnetized poles are slid onto the rotor and affixed, there is also, due to the brittleness of the material, the danger of material fractures due to internal stress after the magnet rings are placed onto the rotor. When machines of this kind are used in regions relevant to safety, for example as servomotors of an electrical steering mechanism in motor vehicles, it can be necessary to cover the magnet ring with an additional protective sleeve made of nonmagnetic material in order to prevent a failure of the machine due to breakage of a magnet ring.

The object of the current invention is to improve the attachment of permanent magnets to the rotor in electrical machines of this kind so that the flaws mentioned above can be largely prevented.

SUMMARY OF THE INVENTION

The electrical machine according to the invention, has the advantage over the prior art that by dividing up the magnet rings of the rotor into individual magnets, these can be simply manufactured in a dimensionally accurate manner and can be magnetized with consistent strength as north poles or south poles. Another advantage lies in the fact that the individual magnets can easily be mounted on the rotor circumference without internal stress and can be precisely positioned. In addition, environmentally hazardous additives such as glues or casting resins can be eliminated. An additional significant advantage is that receiving the axial ends of the individual magnets in frames on both sides allows the manufacturing tolerances of the permanent magnets and of the support to be compensated for through an axial clamping.

Advantageous modifications and improvements of the features disclosed in the main claim are possible by means of the measures described. The permanent magnets are prevented from being spun off by centrifugal forces in that the frames are each provided with recesses for respectively receiving an axial end of the permanent magnets. In order to affix the permanent magnets to the rotor circumference on all sides, the ends of the permanent magnets are affixed in the recesses in the radial, axial, and circumferential directions.

A precise, manufacturing tolerance-compensating positioning of the permanent magnets in the circumference direction is advantageously achieved by providing the ends of the permanent magnets with shaped bevels on both sides, which taper toward the end surface and are received in a positively engaging manner by corresponding negative shaped bevels in the recesses of the frames. A precise, manufacturing tolerance-compensating axial and radial positioning of the permanent magnets on the support is advantageously achieved by providing the ends of the permanent magnets on the outer circumference with shaped bevels, which cause the ends to taper toward the end surface and are received in a positively engaging manner by a corresponding negative shaped bevel in the recesses.

Alternatively to the shaped bevels mentioned above, it is also possible to attach the permanent magnets on all sides in a simplified manner by providing the two axially extending outer edges of the ends of the permanent magnets with chamfers that widen out toward the end surfaces and cooperate in a positively engaging manner with a corresponding negative chamfer in the recesses of the frame. The negative chamfers of the frames here are suitably embodied on the respective insides of claws that point axially toward the permanent magnets and border each recess on both sides.

In order to prevent dangerous bending stresses in the permanent magnets, they are independently clamped in place with a uniform force in that at least the frame at one of the axial ends of the permanent magnets is provided with slits extending radially inward between each pair of adjoining recesses. It is thus possible for the slits to divide the frame into radially outward pointing, axially resilient segments, each of which is provided with one of the recesses on its end surface oriented toward the permanent magnets; an axial end of one of the permanent magnets is clamped into each recess with a wedging force generated by the axially resilient prestressed segments. For a simple production and assembly and a rugged embodiment of the frame disposed at the other axial ends of the permanent magnets, this frame is embodied as a slit-free annular frame whose recesses on the end surfaces each receive an axial end of one of the permanent magnets in a positively engaging manner.

This also permits an absolute positioning of the permanent magnets.

When the rotor design according to the invention is used in transverse flux machines, the permanent magnets preferably constitute at least two annular arrangements, which are spaced apart from each other by a fixed axial distance. The distance of the two annular arrangements from each other is suitably predetermined by a common, slit-free annular frame, both of whose end surfaces are provided with recesses, each for receiving a respective axial end of the permanent magnets in a positively engaging manner. Both when the permanent magnets are arranged in two rings and when they are arranged in multiple rings, it is suitable for only the frames disposed on the two end surfaces of the rotor to be provided with radial slits and axially resilient segments. A simple and rugged structural design of the rotor is produced by placing the permanent magnets and the annular frames onto a common support and attaching them there. The support here is suitably embodied as a magnetic yoke ring for the permanent magnets.

BRIEF DESCRIPTION OF THE DRAWINGS

The invention will be more fully explained herein below, in conjunction with the drawings, in which:

FIG. 3 shows an alternative design for fastening the permanent magnets to the rotor.

DESCRIPTION OF THE PREFERRED EMBODIMENTS

Figure 1:
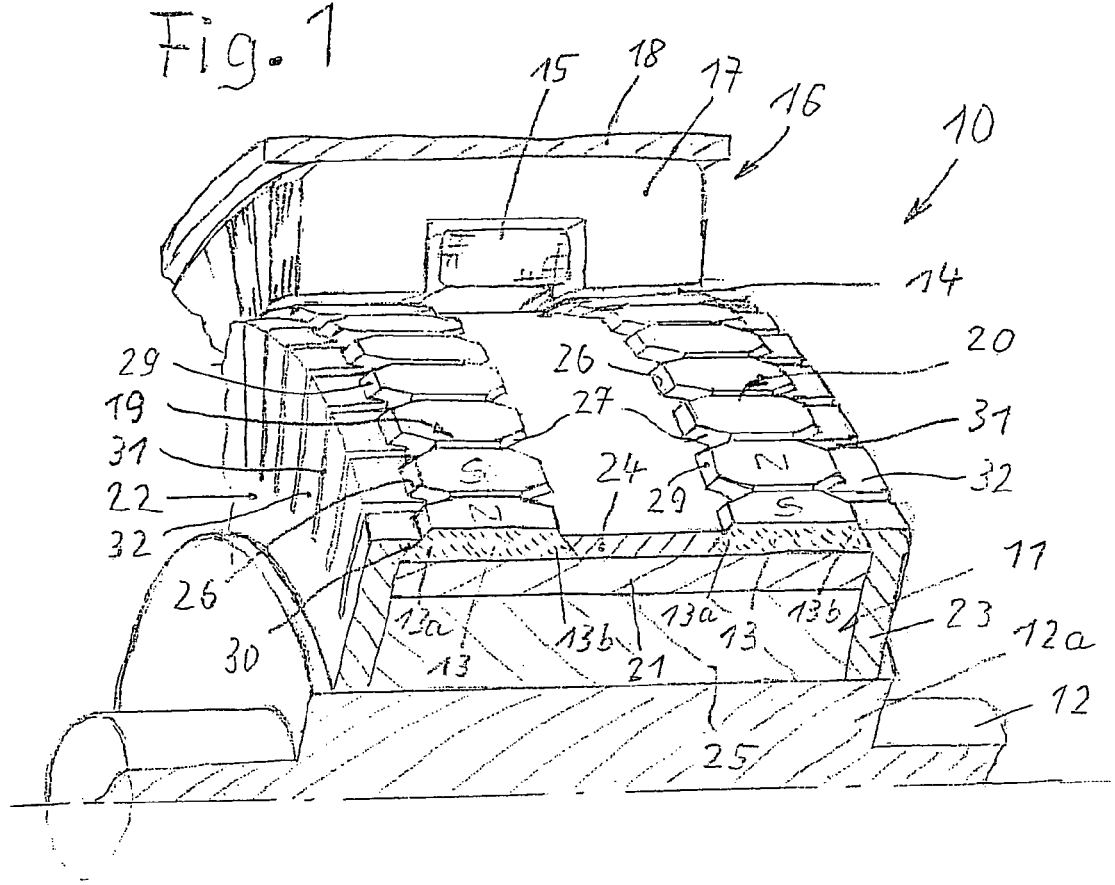
FIG. 1 is a three-dimensional breakaway view of a first exemplary embodiment of an electrical machine with a permanent magnet-excited rotor.

In a longitudinal section that extends to the depth of the central axis, FIG. 1 shows a perspective breakaway view of an electrical machine 10 that belongs to the subgroup of transverse flux motors. The machine has a rotating rotor 11 with a rotor shaft 12. A number of permanent magnets 13 with alternating polarities are disposed around its circumference and the permanent magnets 13 are magnetized in the radial direction. The permanent magnets 13 cooperate across a working air gap 14 with an electrical annular coil 15 of a stator 16, which concentrically encompasses the rotor 11 and whose lamination bundles 17 on the one hand, are disposed opposite the permanent magnets 13 and on the other hand, encompass the annular coil 15 in a U-shape. The stator lamination bundles and annular coils are held and positioned by means of a corresponding yoke housing 18.

The permanent magnets 13 are arranged in two annular arrangements 19, 20 made up of individual magnets disposed next to one another, distributed uniformly around the circumference of the rotor 11. Their undersides rest against an annular support 21, which is comprised of soft magnetic material and serves as a magnetic yoke ring for the permanent magnets 13. The permanent magnets 13 are also clamped at their respective axial ends 13a, 13b in an annular frame 22, 23, 24 made of non-magnetic material, for example heat-resistant fiber-reinforced plastic. The yoke ring 21 is attached to a support ring 25, which is in turn affixed to a section 12a of the rotor shaft 12. Moreover, the two outside frames 22, 23 are pressed onto the end surfaces of this section 12a of the rotor shaft and the middle frame is pressed as an annular frame 24 onto the yoke ring 21. The frames 22, 23, and 24 and the yoke ring as a support 21 are thus directly or indirectly attached to the rotor shaft 12.

In order to absorb the centrifugal forces acting on the permanent magnets 13, the end surfaces of the frames 22, 23, 24 have recesses 26 that each receive a respective axial end 13a or 13b of the permanent magnets 13. The recesses 26 are structurally embodied so that they fix the ends 13a and 13b of the permanent magnets 13 in the radial, axial, and circumferential directions. In order to exactly position the permanent magnets 13 next to one another, each of their ends 13a and 13b is provided with shaped bevels 27 on both sides that cause the permanent magnets 13 to taper toward their ends. These shaped bevels 27 are received in a positively engaging manner in the recesses 26 by corresponding negative shaped bevels 28 (FIG. 2) of the frames 22, 23, 24. In order to fix the permanent magnets 13 axially and provide a sufficient pressure of the permanent magnets against the yoke ring 21, the ends 13a and 13b of the permanent magnets 13 are each provided with an additional shaped bevel 29, which reduces the axial length of the permanent magnets 13 toward the outside, that is along the surfaces of the permanent magnets most distant from the circumferential surface of the rotor. A corresponding negative shaped bevel 30 is embodied in the recesses 26 of the frames 22, 23, and 24 so that the recesses 26 also receive the permanent magnets in a positively engaging manner in the axial direction. In order to also be able to compensate for manufacturing tolerances with as uniform as possible a clamping strength of all of the permanent magnets 13 by the recesses 26 of the frames 22, 23, and 24, the frames 22, 23 disposed on the two end surfaces of the rotor 11 are provided with slits 31 on their outer circumference that extend radially inward between each pair of adjacent recesses 26. These slits 31 divide the frames 22 and 23 into segments 32 pointing radially outward and each segment 32 is provided with a respective recess 26 on its end surface oriented toward the permanent magnets 13. The segments 32 have a more or less powerful axial resilience depending on the material of the frames 22 and 23 and the length of the slits 31. This allows the permanent magnets 13 to be independently clamped to the yoke ring 21 at the ends 13a and 13b by a wedging force of the axially resilient segments 32 in order to compensate for manufacturing tolerances.

It is clear from FIG. 1 that the two annular arrangements 19, 20 of permanent magnets 13 are spaced apart from each other by a fixed axial distance that is constant over the circumference and is predetermined by a common frame in the form of an annular frame 24. Both end surfaces of this slit-free annular frame 24 are provided with recesses 26 for receiving respective axial ends 13b of the permanent magnets 13 in a positively engaging manner. In this connection, in order to achieve an axial clamping that is uniform for all of the permanent magnets 13, it is sufficient for only the frames 22 and 23 disposed on the two end surfaces of the rotor 11 to be provided with radial slits 31 and axially resilient segments 32. The permanent magnets 13 and the annular frame 24 are thus placed onto the magnetic yoke ring 21 that acts as a common support and are attached to it.

Figure 2:
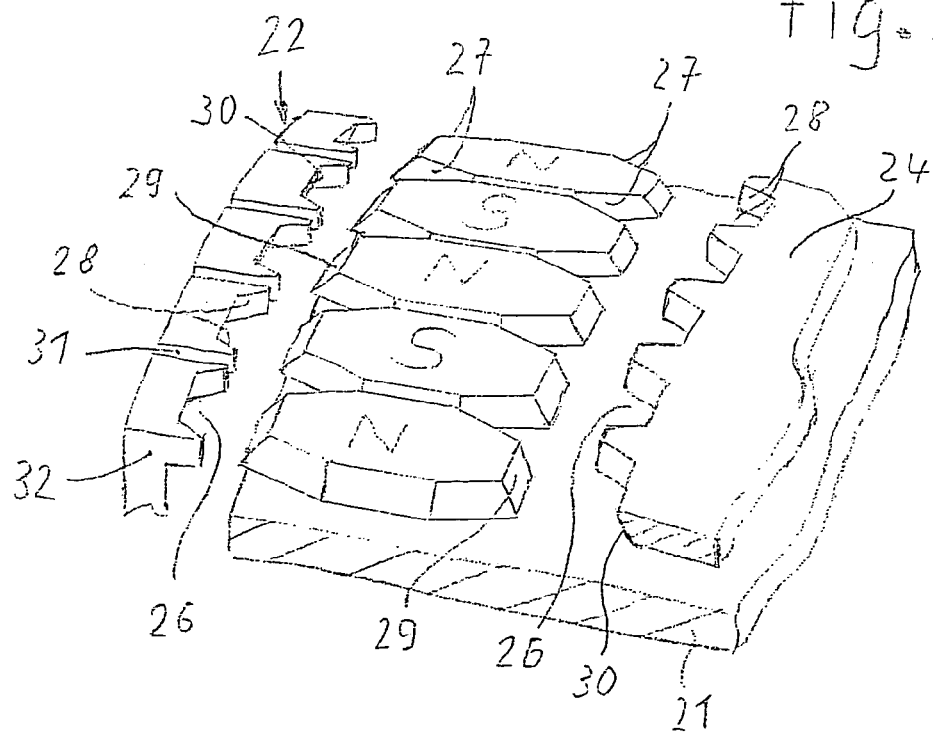
FIG. 2 is a three-dimensional break-away view of the arrangement of a number of permanent magnets on the rotor circumference, before installation of the frames associated with them.

FIG. 2 shows a detail of the rotor 11 from FIG. 1, before the permanent magnets 13 are clamped in place by the two frames 22 and 24 disposed on the end surfaces, with the shaped bevels 27, 28, 29, and 30 mentioned above.

FIG. 3 is a three-dimensional depiction of another exemplary embodiment of the invention in which the axial ends 13a' and 13b' of the permanent magnets 13' are received in a slightly modified fashion before assembly. In this embodiment, the two outer axially extending edges of the ends 13a' and 13b' of the permanent magnets 13' are provided with respective chamfers 35 that widen out as they extend toward the end surfaces 13c of the permanent magnets 13' so that the permanent magnets 13' become narrower in cross section at both ends. These chamfers 35 are engaged by claws 36, which extend axially toward the respective permanent magnets 13' from the frames 22a, 24a and border each recess 26 on both sides. The insides of these claws 36 are respectively provided with chamfers 37 that are the negative of the chamfers 35 of the permanent magnets 13' so that the chamfers 35 of the permanent magnets 13' cooperate in a positively engaging manner with the negative chamfers 37 in the recesses 26 of the frames 22a and 24a. A small gap 38 possibly resulting from irregularities in the yoke ring 21 or the underside 13d of the permanent magnets 13' can, in order to minimize the magnetic losses, optionally be filled with a magnetically active material, for example a gel, thus producing a support over its entire surface.

The foregoing relates to preferred exemplary embodiments of the invention, it being understood that other variants and embodiments thereof are possible within the spirit and scope of the invention, the latter being defined by the appended claims.

What is claimed is:

1. In a permanent magnet-excited electric motor (10) having a rotating rotor (11) including a rotor shaft (12) and permanent magnets (13) disposed in a ring around its circumference, which magnets cooperate with coils (15) of a stator (16) encompassing the rotor, the improvement wherein the permanent magnets (13, 13') are individual magnets disposed next to one another and distributed uniformly over the circumference of the rotor (11) and resting on an annular support (21), and at least one respective annular frame (22, 22a, 23, 24, 24a) comprised of magnetically inactive material, clamping the magnets (13,13') in place at their axial ends (13a, 13b, 13a', 13b'), the support (21) and/or the at least one respective frame (22, 22a, 23, 24, 24a) being attached to the rotor shaft (12), wherein the end surfaces of the at least one respective frame (22, 22a, 23, 24, 24a) are provided with respective recesses (26), each of which receives an axial end (13a, 13a', 13b, 13b') of one of the permanent magnets (13, 13') and wherein the axial ends (13a, 13a', 13b, 13b') of the permanent magnets (13, 13') are fixed in the recesses (26) in the radial, axial, and circumferential directions, wherein the opposite sides of the ends (13a, 13b) of the permanent magnets (13) are provided with shaped bevels (27), which cause the ends (13a, 13b) to taper toward their end surfaces and are received in a positively engaging manner by corresponding negative shaped bevels (28) in the recesses (26) of the at least one frame (22, 23, 24), and wherein the end surface (13c) of the ends (13a, 13b) of the permanent magnets (13) are provided with additional shaped bevels (29), which reduce the axial length of the permanent magnets (13) along the surfaces of the permanent magnets most distant from the circumferential surface of the rotor and are received in positively engaging manner by corresponding negative shaped bevels (30) in the recesses (26).

2. The electrical machine according to claim 1, wherein the permanent magnets (13) constitute at least two annular arrangements (19) that are spaced apart from each other by an axial distance that is constant over the circumference.

3. The electrical machine according to claim 1, wherein the support (21) is embodied as a magnetic yoke ring for the permanent magnets (13, 13').

4. The electrical machine according to claim 1, wherein at least the frame (22, 23) disposed at one of the axial ends (13a, 13b) of the permanent magnets (13) is provided with slits (31) along its outer circumference that extend radially inward between each pair of adjacent recesses (26).

5. The electrical machine according to claim 4, wherein the slits (31) divide the frame (22, 23) into axially resilient segments (32) extending radially outward, whose respective end surfaces oriented toward the permanent magnets (13) are each provided with one of the recesses (26) in which the axial end (13a) of a respective permanent magnet (13) is clamped by the wedging force generated by the axially resilient segments (32).

6. The electrical machine according to claim 5, wherein the frame (24) at the other axial end (13b) of the permanent magnets (13) is embodied as a slit-free annular frame (24), whose recesses (26) on its end surfaces each receive an axial end (13b) of the permanent magnets (13) in a positively engaging manner.

7. The electrical machine according to claim 6, wherein the permanent magnets (13, 13') and the annular frames (24, 24') are placed onto a common support (21) and attached.

8. The electrical machine according to claim 6, wherein the permanent magnets (13) constitute at least two annular arrangements (19) that are spaced apart from each other by an axial distance that is constant over the circumference, and wherein the distance of the two annular arrangements (19) is predetermined by a common, slit-free annular frame (24), each of whose two end surfaces is provided with recesses (26) for receiving respective axial ends (13b) of the permanent magnets (13) in a positively engaging manner.

9. The electrical machine according to claim 8, wherein only the frames (22, 23) disposed on the two end surfaces of the rotor (11) are provided with radial slits (31) and axially resilient segments (32).

10. In a permanent magnet-excited electric motor (10) having a rotating rotor (11) including a rotor shaft (12) and permanent magnets (13) disposed in a ring around its circumference, which magnets cooperate with coils (15) of a stator (16) encompassing the rotor, the improvement wherein the permanent magnets (13, 13') are individual magnets disposed next to one another and distributed uniformly over the circumference of the rotor (11) and resting on an annular support (21), and at least one respective annular frame (22, 22a, 23, 24, 24a) comprised of magnetically inactive material, clamping the magnets (13,13') in place at their axial ends (13a, 13b, 13a', 13b'), the support (21) and/or the at least one respective frame (22, 22a, 23, 24, 24a) being attached to the rotor shaft (12), wherein the end surfaces of the at least one respective frame (22, 22a, 23, 24, 24a) are provided with respective recesses (26), each of which receives an axial end (13a, 13a', 13b, 13b') of one of the permanent magnets (13, 13') and wherein the axial ends (13a, 13a', 13b, 13b') of the permanent magnets (13, 13') are fixed in the recesses (26) in the radial, axial, and circumferential directions, wherein the two outer axially extending edges of the ends of the permanent magnets (13') are each provided with a chamfer (35) that widens out toward the end surface and these chamfers (35) cooperate in a positively engaging manner with corresponding negative chamfers (37) in the recesses (26) of the at least one frame (22', 23').

11. The electrical machine according to claim 10, wherein at least the frame (22, 23) disposed at one of the axial ends (13a, 13b) of the permanent magnets (13) is provided with slits (31) along its outer circumference that extend radially inward between each pair of adjacent recesses (26).

12. The electrical machine according to claim 10, wherein the negative chamfers (37) are embodied on the inside of claws (36) that border each of the recesses (26) on both sides and point axially toward the permanent magnets (13').

13. The electrical machine according to claim 12, wherein at least the frame (22, 23) disposed at one of the axial ends (13a, 13b) of the permanent magnets (13) is provided with slits (31) along its outer circumference that extend radially inward between each pair of adjacent recesses (26).

* * * * *